United States Patent [19]

Hawthorne et al.

[11] Patent Number: 5,764,209

[45] Date of Patent: Jun. 9, 1998

[54] FLAT PANEL DISPLAY INSPECTION SYSTEM

[75] Inventors: Jeffrey A. Hawthorne, San Francisco; Daniel H. Scott, San Jose; Robert E. Cummins, El Granada; Peter J. Fiekowsky, Los Altos, all of Calif.

[73] Assignee: Photon Dynamics, Inc., San Jose, Calif.

[21] Appl. No.: 394,668

[22] Filed: Feb. 22, 1995

(Under 37 CFR 1.47)

Related U.S. Application Data

[63] Continuation-in-part of Ser. No. 852,458, Mar. 16, 1992, abandoned.

[51] Int. Cl.$^6$ ............................................. G09G 3/36
[52] U.S. Cl. .......................................... 345/87; 345/904
[58] Field of Search .......................... 345/87, 88, 92, 345/904; 324/770; 382/8; 348/86, 92, 93, 94, 95; H04N 7/18, 9/47

[56] References Cited

U.S. PATENT DOCUMENTS

| | | | |
|---|---|---|---|
| 2,809,232 | 10/1957 | Hoyt | 178/5.4 |
| 3,718,842 | 2/1973 | Abbott, III et al. | 317/101 CC |
| 4,242,703 | 12/1980 | Tsuboshima et al. | 358/150 |
| 4,400,731 | 8/1983 | Brown | 358/139 |
| 4,491,868 | 1/1985 | Berridge, Jr. et al. | 358/139 |
| 4,533,950 | 8/1985 | Harshbarger | 358/139 |
| 4,899,105 | 2/1990 | Akiyama | 324/158 F |
| 4,922,309 | 5/1990 | Sekiwa et al. | 356/300 |
| 4,987,032 | 1/1991 | Miyasaka et al. | 428/411.1 |
| 5,015,094 | 5/1991 | Oka et al. | 356/336 |
| 5,057,695 | 10/1991 | Hirao et al. | 250/575 |
| 5,111,110 | 5/1992 | Houben | 315/10 |
| 5,113,083 | 5/1992 | Oka et al. | 250/574 |
| 5,169,672 | 12/1992 | Harima et al. | 427/13 |
| 5,216,504 | 6/1993 | Webb et al. | 358/139 |
| 5,239,365 | 8/1993 | Inoue | 356/367 |
| 5,245,326 | 9/1993 | Zalph | 345/92 |
| 5,293,178 | 3/1994 | Kobayashi | 345/87 |
| 5,326,729 | 7/1994 | Yaba et al. | 501/54 |
| 5,333,610 | 8/1994 | Hirao | 128/633 |
| 5,339,093 | 8/1994 | Kumagai et al. | 345/87 |
| 5,444,329 | 8/1995 | Matsuda et al. | 313/479 |
| 5,450,220 | 9/1995 | Onishi et al. | 359/51 |

FOREIGN PATENT DOCUMENTS

| | | | |
|---|---|---|---|
| 5-27704 | 5/1993 | Japan | G09G 3/20 |
| 2254144 | 9/1992 | United Kingdom | G01N 21/23 |

OTHER PUBLICATIONS

Fritsch et al., "Faster Contrast Measurement of LCDs With Improved Conoscopic Methods", Proceedings of the SID, vol. 32/3, 1991, pp. 207–211.

(List continued on next page.)

*Primary Examiner*—Chanh Nguyen
*Attorney, Agent, or Firm*—Townsend and Townsend and Crew LLP

[57] ABSTRACT

An improved testing system and method for testing a flat-panel display is disclosed herein. A display is positioned under a high resolution camera for detection of, for example, brightness uniformity across the display. Errors in the detected image due to aliasing are avoided in the present invention by incrementally shifting the displayed image relative to the camera and detecting the displayed image at various shifted positions. A resulting accurate display can then be reconstructed by identifying those detector pixels generating a maximum signal. A single image may then be reconstructed using only those detected maximum pixel signals. The reconstructed image will be free of aliasing. The reconstructed image may then be analyzed electronically, and any anomalies in the pixels forming the display panel can then be accurately detected. Anomalies due to uneven brightness across the display can be corrected by programming a memory chip for the particular display panel to permanently compensate the display driver signals for each display pixel to eliminate such anomalies in the display. Other tests for viewing angles and chromaticity may also be performed.

20 Claims, 7 Drawing Sheets

OTHER PUBLICATIONS

Wahlstrom, book entitled Optical Crystallography, Wiley & Sons, New York 1964, pp. 80–81 and 236–237.

Miyoshi et al., "Conoscopic Study of Liquid Crystal After Application and Removal of the External Electric Field", Japanese Journal of Applied Physics, vol. 22, No. 12, Dec. 1983 pp. 1754–1765.

Wyszecki et al., "Color Science: Concepts and Methods, Quantitative Data and Formulae", published 1982 by Wiley, pp. 117–169.

Japanese publication entitled: "Liquid Crystal Module Automatic Final Inspection Device Aimed at Replacing Visual Inspection", published in Nikkei Micro Devices, Oct. 1991, pp. 99–100. (English trans. provided).

FLAT PANEL DISPLAY INSPECTION SYSTEM

CROSS-REFERENCE TO RELATED APPLICATION

The present invention is a continuation-in-part of U.S. Ser. No. 07/852,458, filed Mar. 16, 1992 now abandoned, entitled FLAT PANEL DISPLAY INSPECTION SYSTEM.

BACKGROUND OF THE INVENTION

1. Field of the Invention

This invention relates to a testing system, and more specifically, to a testing system for testing flat-panel displays such as liquid crystal displays (LCD) and others.

2. Description of the Background Art

The test systems currently used for detecting defects (e.g., faulty pixels) in flat-panel display systems, such as LCD's, generally utilize a means for generating an image on the display and detecting an error in the resulting image. One such type of LCD tester is described in U.S. Pat. No. 4,899,105 to Akiyama. It is conventional to evaluate the resulting displayed image using the naked eye, as mentioned in U.S. Pat. No. 4,899,105. It is apparent that a camera may be used instead of a human eye so that analysis of the displayed image can then be carried out using a computer.

Since the display pixels of a flat panel display focused on a camera's detector pixel array will typically not result in exactly a one-to-one correspondence of display pixels to detector pixels, a Moiré pattern (or interference pattern) will be generated at the output of the camera, distorting the displayed image as detected by the camera. This is referred to as aliasing. The extent of such distortion in the detected image resulting from aliasing may mask pixel defects in the flat panel displays.

Besides testing for faulty pixels in a display, it may be useful to also detect for brightness uniformity of the pixels across the display. Such a sensitive test could not be accurately performed using known flat-panel display testers.

Other measurements taken by conventional flat-panel display testers may include a viewing angle test, wherein a detector (e.g., a camera or the operator's eye) is moved in an x-y plane parallel to the display, and the brightness or darkness level of one or more display pixels is measured. This method of test requires a relatively large amount of time to physically move the detector over the surface of the display while analyzing the detected image.

Other inaccurate testing methods, such as for testing chromaticity, also exist in the prior art display testers. Accordingly, given the higher and higher resolution of flat-panel displays, there is a need for an improved testing system for such displays which can more quickly and more accurately measure the parameters of a display panel.

SUMMARY OF THE INVENTION

An improved testing system and method for testing a flat-panel display is disclosed herein.

In this test system, an operator first inserts the flat-panel display to be tested under a conventional high resolution camera, such as a charge injection device (CID) type camera or CCD camera. Since each of the detector pixels in the camera may not be identically aligned with an associated pixel in the display, aliasing occurs and a Moiré pattern (or interference pattern) will result, distorting the detected image.

Errors due to aliasing are avoided in the present invention by incrementally shifting the displayed image relative to the camera optics and detecting the displayed image at various shifted positions. A resulting accurate display can then be reconstructed using software by first identifying, for each shifted position, those camera detector pixels which were completely superimposed by a signal display pixel image. This may be done by identifying those detector pixels generating a maximum signal. A single image may then be reconstructed using only those detected maximum pixel signals. The reconstructed image will be free of aliasing effects.

The reconstructed image may then be analyzed electronically using a software program, and any anomalies in the pixels forming the display panel can then be accurately detected.

Anomalies due to uneven brightness across the display can be corrected by programming a memory chip for the particular display panel to permanently compensate the display driver signals for each display pixel to eliminate such anomalies in the display. Thus, display panels may now be corrected to achieve a consistently high performance level.

An alternative embodiment provides a method for electronically detecting a displayed image where the displayed image is formed by a periodic array of display pixels. The present method includes a step of positioning a spatially-periodic detection means for viewing the displayed image. The detection means includes a first spatially-periodic array of detector elements on which the displayed image formed by a second spatially-periodic array of display pixels is focused, each of the detector elements generating signals corresponding to an intensity of light impinging thereon. The present method also includes a step of detecting first signals generated by the detector elements when the detector elements are in a first position relative to the displayed image, wherein the first signals may manifest a first Moiré pattern. A step of shifting the displayed image along an axis relative to a line of the detector elements to a second position is also included. The present method further includes a step of detecting second signals generated by the detector elements when the detector elements are in the second position relative to the displayed image, wherein the second signals may manifest a second Moiré pattern. A further step of averaging intensity levels of the first signals and the second signals generated by the detector elements at each sampling point of the display pixels to reduce effects of the first Moiré pattern and the second Moiré patterns formed by the displayed image impinging onto the detector elements is used.

Furtherance to the preceding embodiment, the present method also includes a step of additionally shifting the displayed image relative to the detector elements along a second line of the display pixels orthogonal to the first line of the display pixels. A step of detecting and averaging signals generated by the detector elements after each step of shifting until the effects of the Moiré patterns on determining relative intensity levels of the display pixels have been reduced to a desired level is also included.

In LCD's and some other types of displays, the driving voltages applied to the display pixels influence the viewing angle of the pixels. Therefore, the viewing angles of any pixels can be corrected using the present test system by programming the memory chip for that display to compensate the driving voltages so as to optimize the viewing angles of the pixels.

In the preferred embodiment, to detect the viewing angle of the display in order to determine any necessary correction, a single pixel on the flat-panel display is energized and detected by a detecting camera whose detector pixel array is optically positioned directly over the display pixels. A polar plot of brightness versus viewing angle is then generated from the detected intensity of the energized pixel across the camera's pixel array while the camera is stationary. This viewing angle test is preferably done for a number of representative pixels around the display to sample the viewing angles for various portions of the display. The appropriate pixel groups may then have correction factors associated with them to optimize the overall viewing angle of the display.

For analyzing the color quality (chromaticity) of a display, the primary color (red, green, and blue) pixels are energized, one color at a time. A number of tuned color filters (referred to as tristimulus filters) are sequentially interposed between the camera and the display for each primary color pixel group. Tristimulus values (using the CIE Colorimetric System) for each pixel color (red, green, and blue) are generated, and the quality of each displayed color is determined using the CIE standard.

In a preferred embodiment, a special tester/display interface connector is used by the tester to enable simple and reliable contact between the tester electrodes and the large number of finely pitched electrodes around the perimeter of the flat-panel displays.

BRIEF DESCRIPTION OF THE DRAWINGS

A preferred embodiment of the testing system in accordance with this invention is described with reference to the following figures.

DETAILED DESCRIPTION OF THE PREFERRED EMBODIMENTS

Figure 1:
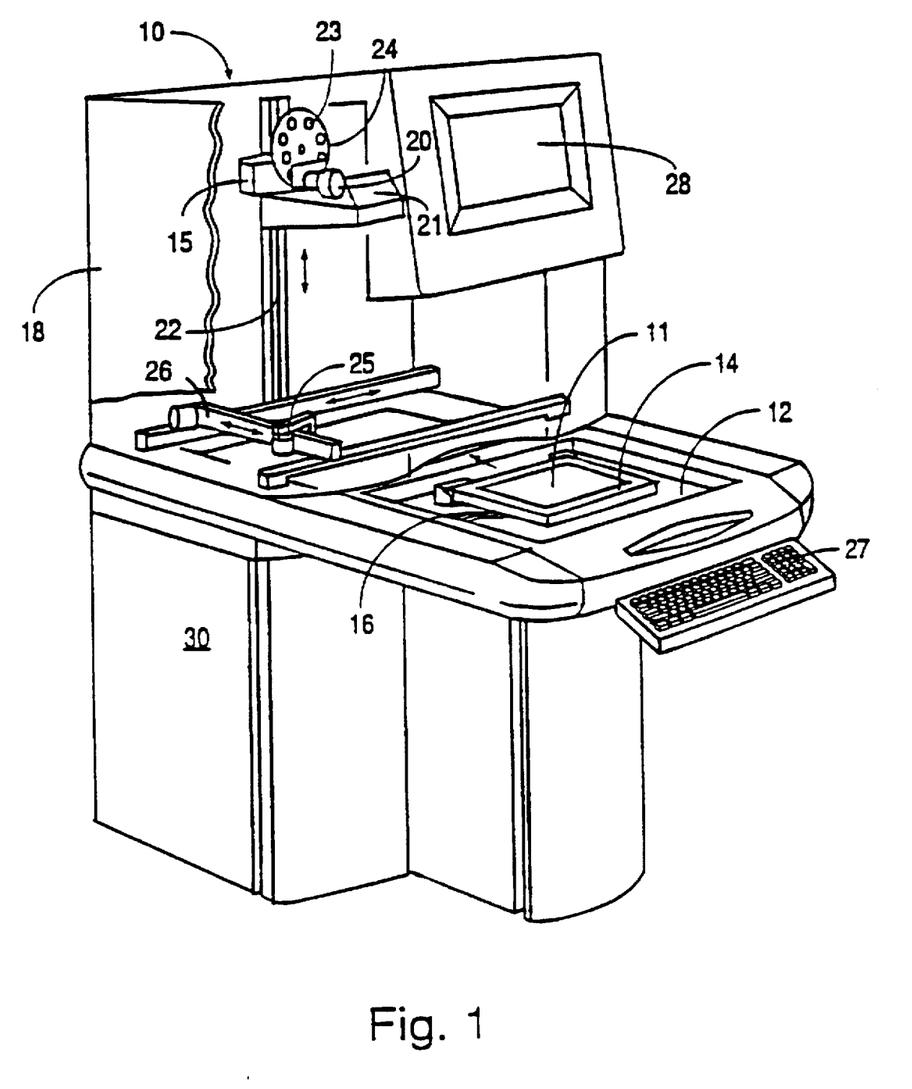
FIG. 1 is a perspective view of one embodiment of the flat-panel display test system in accordance with the invention.

FIG. 1 illustrates a flat-panel display test system 10 incorporating a variety of novel features. A flat-panel display 11, such as an LCD and the like, to be tested is positioned on a slidable table 12, and a hinged frame 14 (shown in more detail in FIG. 10) is then brought down to secure the display panel 11 in place. Slidable table 12 which is typically an x–y stage allows easy positioning of the display panel 11 under a camera 15, such as a coupled CCD device camera and others. As shown, table 12 is preferably movable in an x–y plane, by way of the x–y stage, and even a z-plane for precise positioning of the display.

The x–y stage can be any suitable base unit capable of moving the display panel in an x-direction and/or a y-direction. The stage includes continuous movement in the x-direction and/or y-direction, at a high speed rate of about 20 mm/sec. to about 1.0 mm/sec., and includes a lower speed at about 1.0 mm/sec. to about 0.5 mm. sec. and less. Preferably, the x–y stage also increments at selected dimensions in the x-direction and the y-direction. The increment dimensions ranges from about 400 μm to about 5 μm a display pixel in the x-direction, and about 400 μm to about 5 μm in the y-direction. The x–y stage also needs an accuracy (or tracking tolerance) of about ±5 μm and less in both the x-direction and the y-direction. Of course, exact increment dimensions in the x-direction and the y-direction depend upon the particular application.

A flexible ribbon type wire 16 supplies drive signals from the pixel drive circuitry in test system 10 to conductors on hinged frame 14. Contact between the conductors on hinged frame 14 and the electrodes on the display panel 11 is made preferably automatic by the closing of hinged frame 14, to be discussed in more detail with reference to FIGS. 10 and 11.

The high resolution camera 15 is encased within an upper body 18 of test system 10, partially cut away to reveal camera 15. The camera is preferably an interline transfer CCD, with a 1.5K×1.0K pixel array. Additional cameras may be used in conjunction with camera 15 to obtain the desired resolution and viewing angle. Camera 15, lens 20, and mirror 21 are arranged so that the camera detects a complete image generated on display panel 11 when display panel 11 is appropriately positioned on table 12 and slid in place under camera 15.

Camera 15, lens 20, and mirror 21 are mounted on a movable support structure 22 for adjusting the height in a z-direction, and thus the field of view, of the camera 15. Support structure 22 may also be movable in the horizontal direction such as an x–y direction if desired for a particular application. Features to the support structure are similar to the aforementioned x–y stage.

For testing color displays, a number of selectable color filters 23, including red, green, and blue tristimulus filters, on a filter wheel 24 may be automatically rotated into place between lens 20 and the camera 15 aperture. These filters 23 will be discussed in more detail with respect to FIGS. 4–7.

Test system 10 also includes a second camera 25, which may be a CID camera, a charge coupled device (CCD) type camera or the like, for conducting viewing angle tests of display panel 11. Such a test is discussed in detail with respect to FIGS. 8 and 9. Camera 25 is mounted on an x–y movable support structure 26 for positioning camera 25 over selected portions of display panel 11.

A computer (not shown) and keyboard 27 are also incorporated into test system 10 to allow an operator to identify, via keyboard 27, various characteristics of the display panel or to select specific tests to be conducted. The computer may additionally be used to process image data or otherwise compile test data from a test. A computer monitor 28 may display test parameters and/or the operating status of test system 10.

A light source (not shown) encased within a lower body 30 of test system 10 is used to provide any required back-lighting of the display panel 11. An example of such light source may be triband phosphor cold cathode fluorescent lamp, and the like. A schematic diagram of one possible implementation of test system 10 is shown in FIG. 2.

Figure 2:
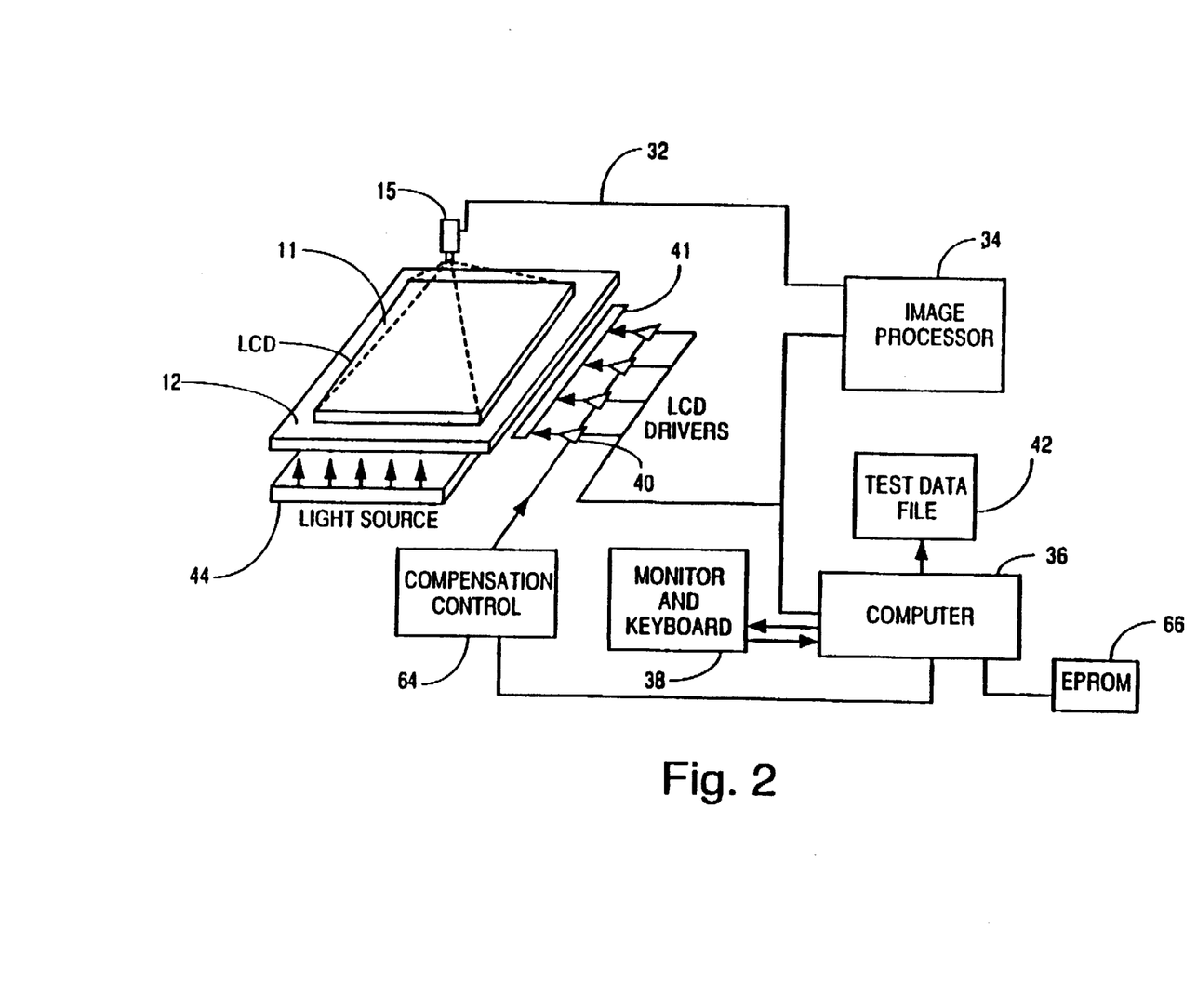
FIG. 2 is a schematic diagram of one configuration of cameras and processing equipment incorporated in the test system.

In FIG. 2, the field of view of the high resolution CID camera 15 covers the enter area of display panel 11. Additional cameras, in conjunction with camera 15, may be used if larger display panels are to be tested or if higher resolution is needed. The output of camera 15 on line 32 is applied to an image processing computer 34, which may then appropriately process the camera 15 signals for evaluating the display image. Image processing computer 34 is controlled by a computer 36, which interfaces with the operator using a monitor and keyboard 38.

As is well known with certain types of displays, the brightness of a display panel pixel may be acutely affected by the viewing angle. To eliminate the differences in display pixel brightness levels due to the different viewing angles of the display pixels with respect to the camera lens 20, the signals outputted by the camera detector pixels on line 32 in FIG. 2 may be compensated by digital techniques to remove any effects of viewing angle on the detected brightness levels of the display panel pixels.

A test program for a specific type of display panel is programmed into computer 36 and automatically controls the test procedures, including applying signals to the display panel drivers 40. Conductors 41 (shown as flexible ribbon 16 in FIG. 1) couples the driver output signals to the hinged cover 14, shown in FIG. 1, and ultimately to the electrodes on display panel 11.

The results of a test for each display panel are recorded in a test data file 42. This enables any trends in defects or non uniformity to be detected and corrected in the manufacturing process.

For a light-blocking type LCD display panel placed on table 12, a back-side light source 44 is used. Displays in which the display pixels themselves emit photons may not require a backlight.

A display panel 11 which is positioned on table 12 in FIGS. 1 or 2 may either be a completed display, prior to its connection to a lap-top computer or the like, or may be a panel which is not completely fabricated. This enables the display manufacturer to save costs of further manufacture if the display panel could not be brought within specifications and enables the correction of certain defects in the display panel. Testing of such an incomplete display may also confirm specifications at various points in the manufacture of the display panel.

As a first test, the automatic test system 10 may be programmed to conduct a display pixel brightness uniformity test and calculate necessary adjustments for each of the pixel driving voltages to correct for brightness nonuniformity. The test first determines the relative brightness of each of the pixels of a display panel. For such a test, test system 10 must apply voltages to the electrodes on the display panel to energize the pixels and display an image to be detected. However, for high resolution displays to be accurately inspected with readily available electronic cameras, it is necessary to eliminate the image distorting effects of aliasing that occur when display pixels are imaged onto a camera detector array having detector pixels which do not uniformly align with each of the pixels of the display panel.

Aliasing is a well-known phenomena that may manifest itself as a Moiré pattern (or interference pattern), which is a periodic modulation of an image voltage signal created by the camera array. The Moiré phenomenon is due to the display pixels not being mapped onto the camera detecting pixels in exactly a one-to-one correspondence. If the mapping is not precisely a one-to-one correspondence, the photons associated with certain display pixels will fall onto non-sensitive portions (if any) of the camera array, and, conversely, the "streets and alleys" between the display pixels will be imaged onto sensitive areas of the camera array. The result of this less than optimal pixel relationship results in a Moiré pattern, such as shown in FIG. 3, that distorts the true relative brightness levels of the display pixels.

Test system 10 employs a special multi-frame image translation technique to eliminate any inaccuracies in a detected image due to aliasing.

Figure 3:
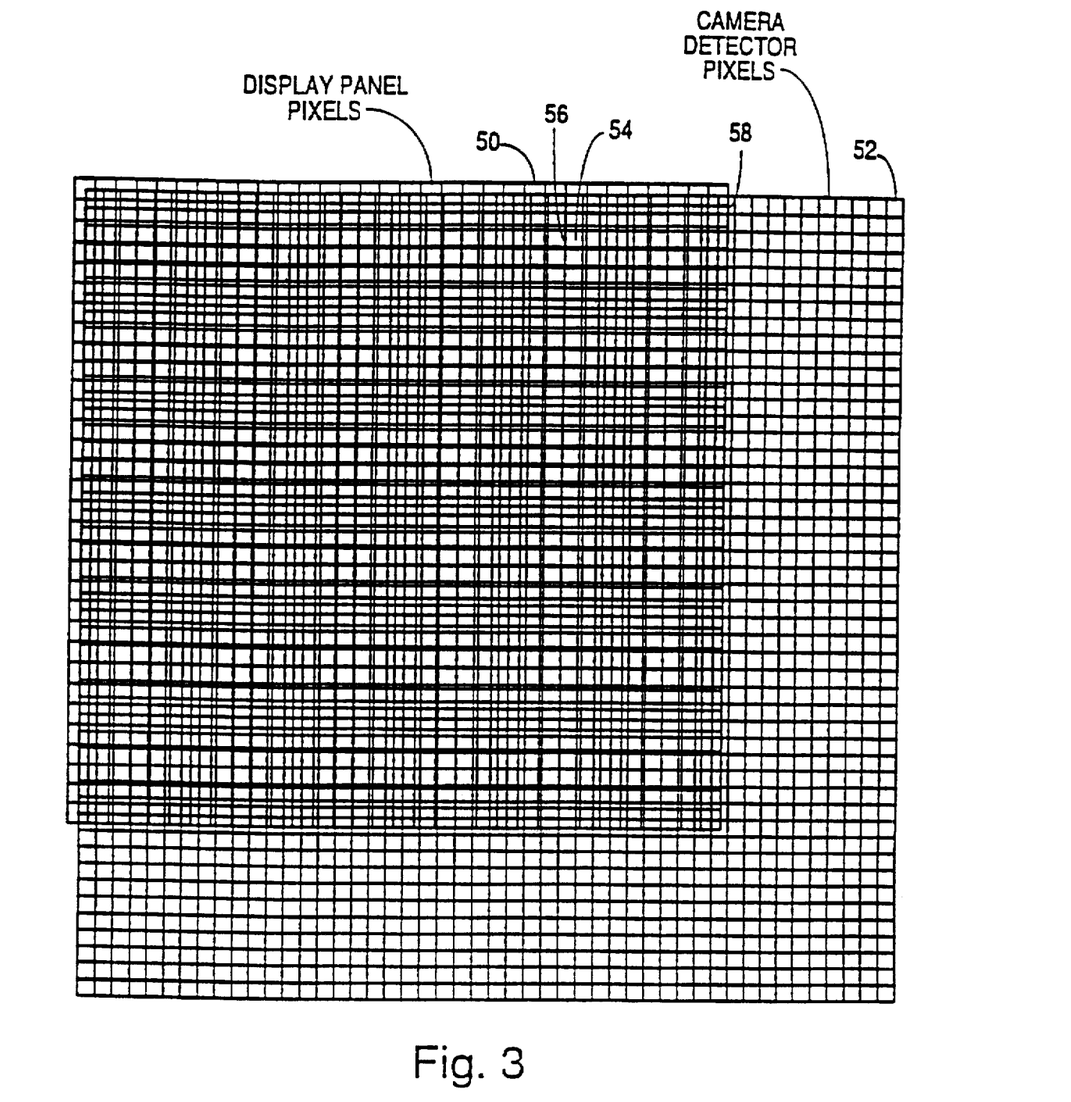
FIG. 3 illustrates a Moiré pattern which typically results when a display image is detected by a camera incorporating a detector pixel array.

FIG. 3 illustrates a sample Moiré pattern which may result from the focused display panel pixels 50 not being mapped in a one-to-one correspondence with the smaller and more densely populated camera detector pixels 52. As seen from FIG. 3, certain of the camera detector pixels 52, such as pixel 54, are completely superimposed by a single display panel pixel image 56. Consequently, these display panel pixels 56 completely superimposing a single camera detector pixel 54 will be detected by the camera detector pixels as being brighter than those display panel pixels, such as pixel 58, whose images partially fall on the nonsensitive areas between two adjacent camera detector pixels 52. Due to the Moiré pattern of FIG. 3, if only a single display image were evaluated, the brightness of certain display panel pixels will be inaccurately detected as being brighter than other display panel pixels.

In a specific embodiment used by test system 10 for determining a display panel's brightness uniformity, a first inspection of the display panel pixels is conducted at a first alignment of the display panel image and the camera pixel array, such as the alignment shown in FIG. 3. The brightness level (i.e., intensity) signal generated by each of the camera detector pixels 52 for this first alignment is cross-referenced to a specific display pixel which gave rise to the brightness level signal and then mapped into a memory within computer 36 (FIG. 2). Suitable mapping techniques would be known to those skilled in the art.

In a second step of detecting the brightness uniformity of the display panel, the display image is slightly shifted relative to the camera detector pixels 52, such as by either physically shifting the display panel or camera(s) optics or by changing the angle of reflecting mirror 21 (FIG. 1). After this shifting, another image of the display panel is detected and mapped into memory. The Moiré pattern will be slightly different than that shown in FIG. 3.

The display panel image is then shifted again relative to the camera detector pixels. This process is repeated until each of the display panel pixels has, during any of the detection stages, been detected by a camera detector pixel located entirely within an image of the display pixel. A camera detector pixel which is located entirely within a display pixel image (i.e., completely superimposed by the display pixel image) will detect an accurate relative brightness level of the display pixel.

With reference to FIG. 3, the number of required shifts of the display panel image with respect to the camera detector pixels may include four small incremental shifts to the left or right and four small incremental shifts up or down before the Moiré pattern in FIG. 3 is repeated. In a more preferred embodiment, the camera is displaced relative to a zero point on the display panel in a first x-direction at a distance $x_1$, a second x-direction at a distance $x_2$, a first y-direction at a distance $y_1$, and a second y-direction at a distance $y_2$. The distance $x_2$ is equal to about the distance $(-x_1)$ or $2y_1$, and the distance $y_2$ is equal to about the distance $(-y_1)$ or $2y_1$. Of course, the required number of shifts and magnitude of the shifts will be that needed to allow each of the display pixels to be detected by a camera detector pixels residing wholly within the projected image of the display pixel. A single map is then made of only those maximum intensity signals associated with each display pixel.

This information is then used to analyze the entire display.

The above-described method is considered a specific embodiment. An alternative to first determining the maximum intensity ratio associated with each display pixel after all the incremental shifts and mapping these maximum intensities ratios into a single map is to simply average, over all the incremental shifts, the brightness level output signals of a camera detector pixel receiving any portion of a corresponding display pixel image. This average intensity level for each display pixel over all the incremental shifts would then be mapped so that each display pixel would be associated with an accurate relative intensity level.

In an alternative preferred embodiment, the present method also employs use of several images to average out a periodic modulation of a Moiré interference pattern. The present method includes a step of capturing from a display panel a first image which contains the periodic modulation. The first image is captured by way of a CCD type camera or the like, and preferably stored into memory by way of standard mapping techniques.

A step of displacing the CCD camera relative to the display panel is then performed. The display panel is displaced in an x-direction and/or a y-direction relative to the CCD camera array. Alternatively, the CCD camera is displaced in an x-direction and/or a y-direction relative to the panel. Alternatively, both the CCD camera and panel are displaced in x and/or y-directions to create a relative spatial displacement between each of them. The relative displacement between the CCD camera and the panel is preferably about one-half of a panel display pixel period in the x-direction when displacement occurs in the x-direction. Alternatively, the relative displacement between the CCD camera and the display panel is preferably about one-half of a panel display pixel period in the y-direction when displacement occurs in the y-direction. The relative spatial displacement between the CCD camera and the display panel is one-half of a panel display pixel period in the x or the y directions.

The preferred embodiment also includes a step of capturing (or acquiring) a second image of the display panel, and storing such second image into memory also by way of standard mapping techniques. The second image also contains the same periodic modulation with the same period as the first image. But the placement of the periodic modulation of the second image will be displaced by one-half of a period in either the x-direction or the y-direction relative to the first image by way of the displacing step. Of course, the placement of the periodic modulation cannot be positioned onto another display pixel at the same relative location of the display pixel in the first image acquisition step.

A step of adding the first and second images to one another are then performed by use of standard image processing techniques. The periodic patterns effectively cancel each other out and the "real" modulations in the panel are preserved. Any number of images can be added together as long as they meet the following criteria. Preferably, the number of images is at least two, and more preferably the number of images is two and greater, and more preferably the number of images is four and greater. In a more preferred embodiment, the camera is displaced relative to a zero point on the display panel in a first x-direction at a distance $x_1$, a second x-direction at a distance $x_2$, a first y-direction at a distance $y_1$, and a second y-direction at a distance $y_2$. The distance $x_2$ is equal to about the distance $(-x_1)$ or $2x_1$, and the distance $y_2$ is equal to about the distance $(-y_1)$ or $2y_1$. Each image that is acquired must have a matching image (or complementary image) with a relative displacement of one-half a panel pixel period in the x-direction or the y-direction, or both the x and y directions. Alternatively, the camera may be displaced in the y-direction before the x-direction, or a combination thereof.

In an alternative specific embodiment, the present invention provides a method for reducing and even eliminating a periodic modulation from a display panel image signal by way of filtering. The present method includes a step of filtering a modulated signal by way of a spatial filter from the display panel image signal. A period of the modulated signal is determined from a period of the display panel pixels and a period of the CCD pixels in spatial domain. An image processor (and computer) performs a spatial filter onto the display panel image signal by convolving the CCD signal with a filter of a width designed to remove the periodic modulation. Alternatively, the CCD signal from spatial domain to a frequency domain using a techniques such as a Fourier Transform and the like. A frequency of the Moiré interference pattern can be calculated from the period of the CCD pixels and FPD pixels. Techniques such as bandpass filtering and the like can be used to remove selected frequencies which include the Moiré interference pattern.

Now that the accurate relative intensity for each of the display pixels has been mapped into memory, using any of the above-described techniques, a preferred next step is to analyze the brightness uniformity across the display panel and then take steps to correct for any brightness nonuniformity. In one embodiment, this is accomplished by detecting the minimum display pixel brightness level and using that minimum brightness as a baseline for the correction of all other display pixel brightnesses. Compensation factors are then calculated for each of the display pixel driving voltages.

These compensation factors are then loaded into a look-up table in memory, located in computer 36 in FIG. 2. These factors in the look-up table may then be applied to the display drivers, via a compensation control circuit 64 in FIG. 2, to lower the drive voltages for those pixels whose brightness levels need to be attenuated to match that of the minimum brightness pixel. The displayed image is then detected again using the same process described above, and the brightness levels are again measured to determine any nonuniformity. This process for correcting the brightness uniformity may be reiterated until the desired brightness uniformity is established.

It will be understood by those skilled in the art that other techniques may be substituted for the method described above relating to lowering the brightness level of all pixels to match a minimum brightness level. One alternative technique would be to determine an average display pixel brightness level and then raise or lower the individual display pixel brightness levels to match this average brightness level. Such an alternative of using the average brightness level as a baseline would be desirable if there are pixel defects (i.e., one or more pixels have a zero brightness level).

As an alternative to the iterative process described above, it may also be desirable to instead successively increment the display pixel drive voltages for selected pixels in the display while measuring the brightness uniformity across the display. This alternative process of determining brightness uniformity would be conducted for each shifted position of the display image relative to the camera detector pixels. The selected pixels in the display to be adjusted for each image shift would be only those identified as having an image completely superimposing a single camera detector pixel to avoid the effects of the Moiré phenomenon illustrated in FIG. 3. After all the image shifts, all the display pixels should have a predetermined same brightness level.

It will be understood that a pixel darkness level may be substituted for a pixel brightness level depending on if the display pixels scatter light or if the display pixels themselves emit light.

Once the final compensation factors for each of the display pixels are stored in the look-up table, these compensation factors may then be down-loaded into an EPROM chip 66 (FIG. 2) for that particular display panel tested. The EPROM 66 would then be disconnected from test system 10 and installed in a drive system for that particular display panel to permanently control the compensation of the display driver signals to achieve a uniform brightness across the display panel.

For certain types of display panels, such as LCD panels, an energizing pixel voltage may also affect at what angle the pixel element seems brightest (or darkest). Thus, it is possible by using the above techniques for compensating pixel driving voltages to adjust the energizing voltage for each of the pixels to set the angle at which the image on the display panel looks brightest. This may be desirable where the intended viewer is not directly facing the display panel in a particular application, such as in the cockpit of an airplane.

The above brightness uniformity test may also be used to cause the display pixels to have the greatest uniform contrast ratio (ratio of brightness to darkness) rather than simply to set a brightness level at a baseline level. For such achievement of a uniform contrast ratio across the display panel, both the maximum brightness and maximum darkness of the pixels must be measured and compensation factors be generated for both brightness uniformity and darkness uniformity.

All image processing and other analysis may be conducted using digital techniques, and Fourier conversion may be used as necessary to characterize the signals.

Pixel defects and other defects (e.g., shorted or open conductors) in the display panel may be simply detected by detecting a pixel brightness level below a threshold value. Such defects may be identified by test system 10 and fixed or, alternatively, the display panel may be discarded. To enable such fixing of defects, it is recommended to test the display panel during a manufacturing stage where its pixel elements and conductors are exposed.

The test system 10 may include a special camera and/or zoom lens which can automatically be directed by test system 10 to any defective display portion, and the defective portion may be photographed to aid in the correction of the defect. Methods of correction of a defect in a display panel are described in copending U.S. application Ser. No. 07/716, 592, assigned to the present assignee.

For color displays, color filters 23 in FIG. 1 are used to detect the brightness levels and chromaticity of the red, green, and blue display panel pixels.

Figure 4:
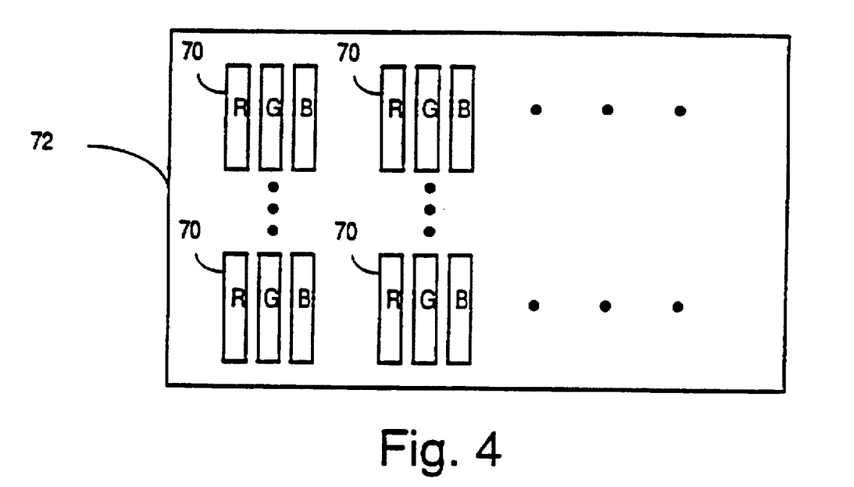
FIG. 4 illustrates pixel groups of red, green, and blue pixels in a color display panel, wherein one color pixel within each pixel group is energized at a time during a test for brightness level and chromaticity of a color display panel.

To detect brightness uniformity across a color display panel having individually energizable red (R), green (G), and blue (B) pixels, as illustrated in FIG. 4, a single color of pixels is energized at a time. For example, with reference to FIG. 4, only red pixels 70 would be initially energized in the display panel 72.

Figure 5:
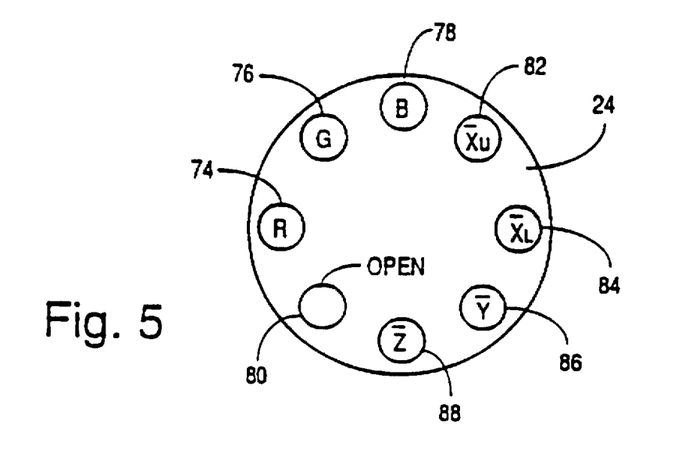
FIG. 5 illustrates a color filter wheel incorporated in the test system for detecting brightness level and chromaticity of a color display panel.

The filter wheel 24 in FIG. 1 is shown in more detail in FIG. 5. When detecting the brightness (not chromaticity) of the red pixels 70 in FIG. 4, the filter wheel 24 is positioned so that a narrow bandpass red filter 74 will be interposed between the camera lens 20 and the camera 15 aperture. The image across the display is detected using the incremental shifting techniques previously described to avoid aliasing effects. Since, in color displays, each display pixel imaged onto the camera detector pixel array will generally be smaller than a single detector pixel, the signal-to-noise (S/N) ratio of each color display pixel will be relatively small. To increase the S/N ratio while at the same time avoiding aliasing effects, an average intensity value outputted by the camera detector pixels is taken after a predetermined number of incremented shifts. (This is in contrast to mapping only a minimum pixel intensity for a single shift, as previously described.) This average value will then be mapped into a memory and will accurately reflect the relative brightness of the red pixels in the color display.

Any brightness non-uniformities can be corrected using the methods previously described with respect to FIG. 2. Pixel defects may also be identified.

In a next step, all green pixels are energized and the displayed image filtered by the narrow bandpass green filter 76 shown in FIG. 5. The brightness level detection process is repeated in a manner identical to that described above with respect to the red pixels.

The process is then repeated for the blue pixels being filtered by the blue filter 78 in FIG. 5.

Thus, the brightness levels of the red, green, and blue pixels in a color display can be accurately measured, without the effects of aliasing, and corrected, if necessary, using test system 10.

For monochromatic displays, the filter wheel 24 in FIG. 5 may be set so that the opening 80 is between the lens 20 and the camera 15 aperture.

A second filter wheel may be located in front of filter wheel 24 to provide neutral density filters (e.g., shades of gray) to attenuate light from high brightness display panels.

Figure 6:
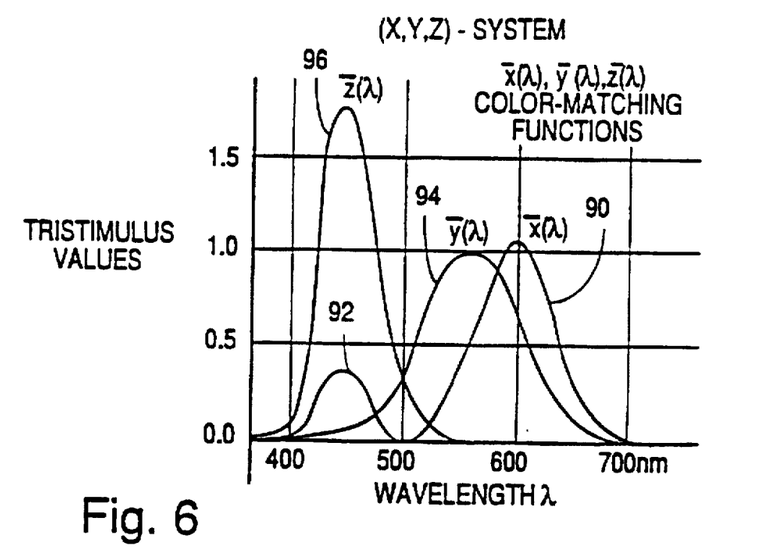
FIG. 6 is a graph of CIE spectral tristimulus values versus wavelength, used for determining chromaticity.

For testing the chromaticity of a color display panel, tristimulus filters 82, 84, 86, and 88 are used to modify the camera's 15 spectral response to match the CIE Colorimetric System tristimulus spectral response for each of the four primary stimuli curves $\bar{x}(\lambda)$ 90, 92, $\bar{y}(\lambda)$ 94, and $\bar{z}(\lambda)$ 96 shown in FIG. 6. The tristimulus spectral responses shown in FIG. 6 take into account the sensitivity of a human eye to the various wavelengths of light.

Details regarding the CIE Colorimetric System and the spectral tristimulus curves shown in FIG. 6 are provided in the book entitled "Color Science: Concepts and Methods, Quantitative Data and Formulae," by Wyszecki, et al., Chapter 3, Wiley, Canada, 1982.

This chromaticity test conducted by test system 10 determines the quality or pureness of the red, green, and blue emitted by the red, green, and blue pixels in a color display panel. Using the color filters 82, 84, 86, and 88 to achieve the tristimulus spectral responses 90, 92, 94, and 96, respectively, shown in FIG. 6, any displayed color may be defined by its detected tristimulus values. As an example of applying the tristimulus spectral responses of FIG. 6 to determine the color quality of a certain color display panel image when only red pixels are energized, the output of the camera 15 may correspond to a tristimulus value of 0.5 when using $\bar{x}(\lambda)$ filter 82, correspond to a tristimulus value of 0.2 when using $\bar{y}(\lambda)$ filter 86, and correspond to a value of zero when using $\bar{x}(\lambda)$ filter 84 and $\bar{z}(\lambda)$ filter 88.

Figure 7:
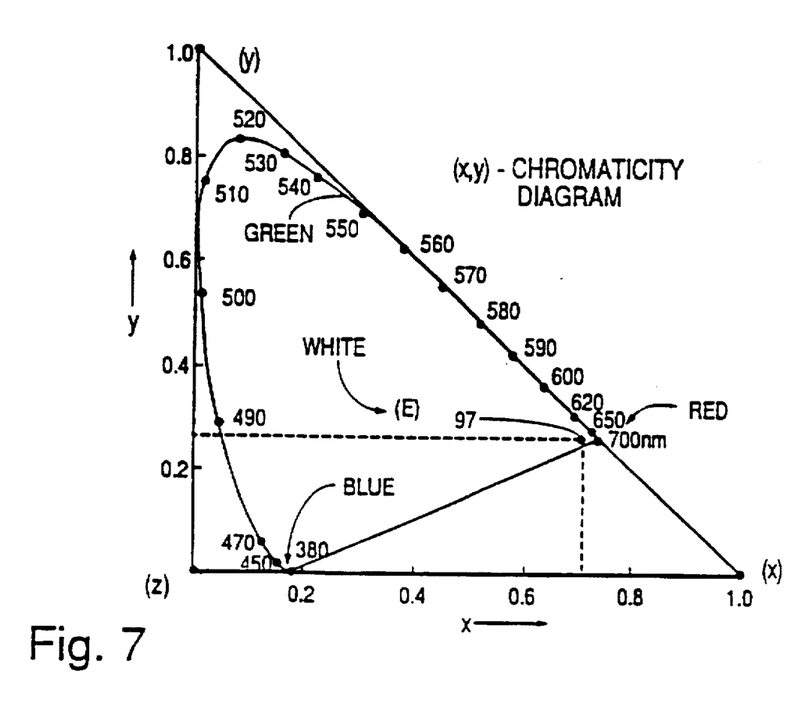
FIG. 7 is a CIE chromaticity diagram used to plot tristimulus values in order to identify a resulting color.

Once the tristimulus values are obtained, the coordinates x, y, and z are calculated in order to plot these values on the x-y CIE chromaticity diagram of FIG. 7. The values of x, y, and z are calculated a follows:

$$x = \frac{\bar{x}(\lambda)}{\bar{x}(\lambda) + \bar{y}(\lambda) + \bar{z}(\lambda)}$$

$$y = \frac{\bar{y}(\lambda)}{\bar{x}(\lambda) + \bar{y}(\lambda) + \bar{z}(\lambda)}$$

$$z = \frac{\bar{z}(\lambda)}{\bar{x}(\lambda) + \bar{y}(\lambda) + \bar{z}(\lambda)}$$

Using the tristimulus values mentioned above, x is calculated to be approximately 0.71, y is calculated to be approximately 0.28, and z is calculated to be zero.

These chromaticity coordinates may then be plotted as point 97 on the x-y CIE chromaticity diagram in FIG. 7 to reveal that such a displayed red color image by one or more pixels in the color display panel under test is virtually pure red.

One of ordinary skill in the art will readily be aware of the background information provided on tristimulus values above. Additional detail may be obtained from the above-mentioned book by Wyszecki et al.

In an actual application, a range of wavelengths will be emitted by a color display panel pixel, and such a range may be depicted as a small circle or an ellipse when plotted on the diagram of FIG. 7. The location and size of this circle or ellipse will determine the quality of the displayed pixel image. Although the determination of tristimulus values and the plotting of coordinates on the diagram of FIG. 7 have been described with respect to mental calculations and manual plotting, the determination of these values and their characterization is performed by software in test system 10. If desired, a plot as shown in FIG. 7 may actually be printed by the test system 10 for a single pixel or for the entire display panel. Otherwise, a simple rating of the color display may be provided by the test system 10.

The above-described process used for determining the pureness of red emitted by the red pixels in the display being tested is then conducted for the green pixels and the blue pixels in the color display panel, and a similar analysis is performed to determine the quality of the green and blue display qualities of the color display panel.

The quality of color output of each individual pixel in the color display panel may be mapped in a memory of computer 36 (FIG. 2). The mapped data can be compared to any manufacturer's specifications for color to determine the quality of each of the pixels in the color display panel. Such a determination of color quality may be for each pixel or for selected portions of the display or for the entire display.

In a preferred embodiment, the tristimulus filters 82, 84, 86, 88 are absorptive type and the filter material is optical quality glass. The filters are manufactured using optical fabrication techniques and tolerances. To achieve a highly accurate match to the standard theoretical tristimulus spectral responses shown in FIG. 6, each of the four tristimulus filters 82, 84, 86, 88 is a lamination of several different filter glasses with different thicknesses and spectral transmissions.

For rays passing through the filters at non-normal incidence, the transmission of an absorptive filter will change due to an increase in the optical path length. However, it was determined, through modeling, that if the percentage change in transmission is the same for each filter (and it will be because the ray will be incident on each filter at the same angle) that there will be no error in the chromaticity coordinates, since the chromaticity coordinates are normalized functions of the color coordinates. This is significant because, to image a large area, the optical system must take in rays at large angles of incidence. Using these techniques, we have achieved a calorimeter capable of performing chromaticity measurements over a large area, up to and exceeding 70,000 $mm^2$.

Aberrations in the optical system are minimized by placing the filters closely in front of the camera 15.

Minimizing the aberrations will increase the resolutions of the optical system.

Another test which may be conducted by test system 10, especially for LCD panels, is a viewing angle characterization test. As is well known, the effective viewing angle for an image displayed on an LCD panel is relatively limited and may influence the usefulness of the LCD panel.

A conventional electronic method to detect the viewing angle of a display panel is to move the angle of a detector (which may be a human eye) relative to the display panel to detect where the brightness level of an image falls to a certain percentage of the maximum brightness.

Figure 8:
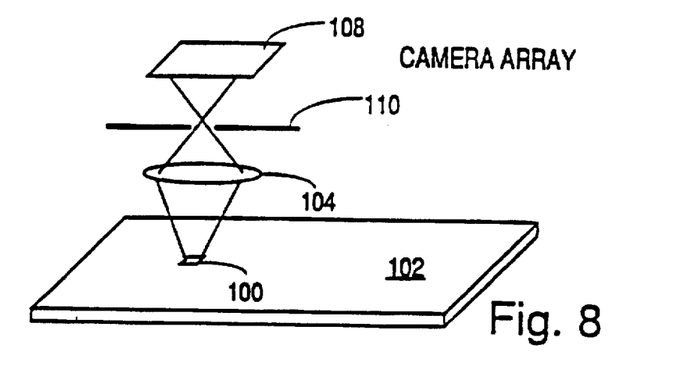
FIG. 8 is a schematic diagram of a configuration for conducting a viewing angle characterization test.

FIG. 8 illustrates an improved viewing angle characterization method carried out by the automatic test system 10 in FIG. 1.

In FIG. 8, a single pixel 100 is energized in a display panel 102. A lens 104 on camera 25 in FIG. 1 is used to focus substantially all light emanating from pixel 100 onto a camera pixel array 108.

Preferably, lens 104 comprises two infinity corrected microscope objective lenses, positioned back-to-back, so that the image of the pixel 100 can be placed closer to the camera pixel array 108. If the panel 102 were a reflective type LCD, lens 104 would be used to focus the effective darkness "emanating" from pixel 100, and a light source would be mounted either above the LCD or under the LCD. A field stop 110 is used to limit the field of view to only that angle sufficient to measure the viewing angle of pixel 100.

Figure 9:
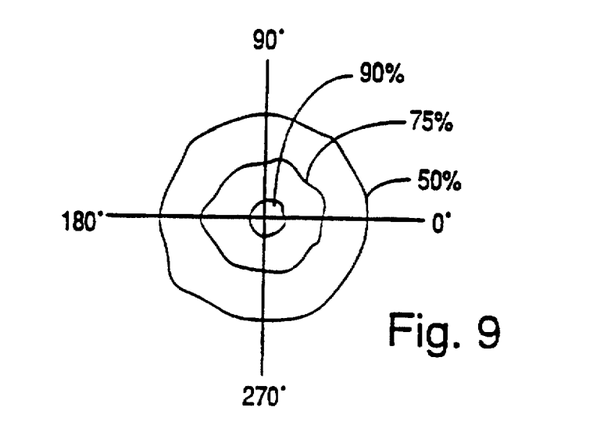
FIG. 9 is a polar plot which may be generated in a viewing angle characterization test.

The pixel image is then focused on camera pixel array 108, and each pixel within array 108 outputs a signal corresponding to the detected brightness of the pixel image. While pixel array 108 is fixed relative to pixel 100, virtually the entire pixel array 108 area is used to directly map the brightness level versus viewing angle of the single display pixel 100. No interference patterns are required to be generated using this method. The maximum brightness level, generally located at a central portion of array 108, may then be compared to the other brightness levels detected around the array 108 to determine where in array 108 the brightness level falls off to, for example, 50% of the maximum brightness. A computer, such as computer 36 in FIG. 2, in combination with an imaging processor 34, then effectively generates a polar plot, such as shown in FIG. 9, of the brightness level versus viewing angle for the single pixel 100. The polar plot may then be stored in test data file 42 and/or printed to enable one to visually examine the brightness level versus viewing angle.

Alternatively, a predetermined criteria for the viewing angle may be compared by the computer with the internally generated polar plot, and the viewing angle may be simply identified to the operator as pass/fail.

Preferably, a number of individual pixels 100 around the display panel 102 in FIG. 8 are measured to obtain a representative viewing angle for selected areas over the display panel 102. This may be used to approximate the viewing angle of the entire display panel 102 and to generate a polar plot of the entire display.

Other lens and camera arrangements may be used instead of the configuration of FIGS. 1 and 8, such as placing camera array 108 sufficiently close to pixel 100 so as to eliminate the need for lens 104 or to use reflector optics rather than refractive optics. Other optical arrangements would be obvious to those of ordinary skill in the art.

Additionally, in a preferred embodiment, test system 10 incorporates a novel display panel connector 120 (FIG. 10) whose electrical contacts may be quickly and reliably pressed onto the electrodes of a display panel during testing. It has been found very difficult in the past to quickly and reliably connect the many finely pitched thin metal-film contacts around the perimeter of the display panel to electrodes of a test system.

Figures 10, 10A, 10B:
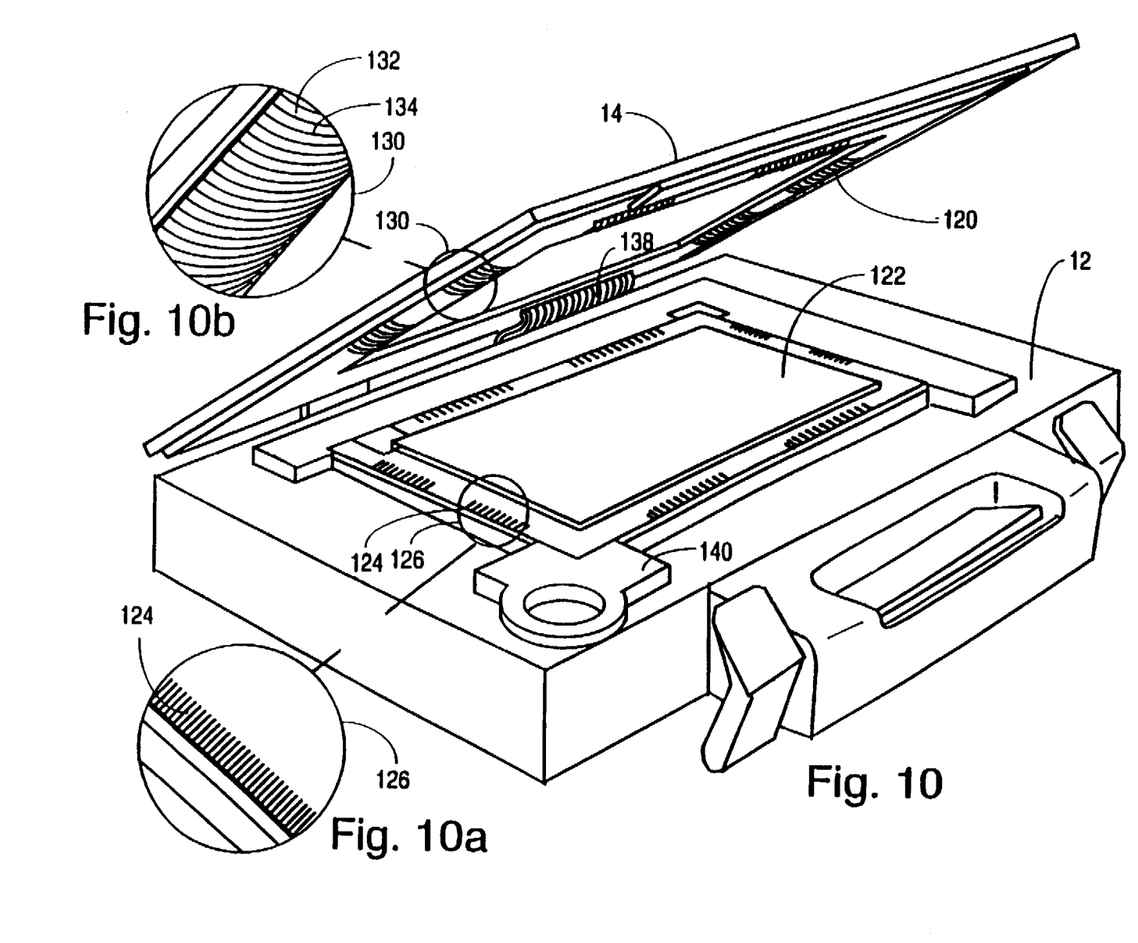
FIG. 10 is a perspective view of an improved display panel connector, mounted on a hinged frame in the test system for FIG. 1, for interfacing a display panel to the test system.

FIG. 10 illustrates an LCD array 122 with finely pitched metal film electrodes 124 arranged around its periphery for coupling electrical signals to the various pixel elements forming the LCD array. An enlargement of an edge portion of LCD 122 within circle 126 illustrates in more detail the metal film electrodes 124. Generally, a pixel in the LCD array 122 is energized by energizing a specific row line and column line in the array 122 terminating in an associated electrode 124. Typically, in an LCD, electrodes 124 are formed on glass, where such electrodes 124 may have a pitch (distance between the centers of adjacent electrodes) of 1/10,000th of an inch. In a conventional test system, alignment of the LCD electrodes 124 with a test system connector would normally be done manually.

To more quickly and reliably electrically couple display panel 122 to test system 10 in FIG. 1, connector 120 is provided on a bottom surface of hinged frame 14 (also shown in FIG. 1). One form of connector 120 is shown in detail in FIG. 10 within circle 130, where a flexible tape 132 has metal traces 134 formed thereon corresponding to a group of thin film electrodes 124 shown within circle 126. Such a flexible tape 132 may be formed of a polymer tape, such as Kapton™, having traces 134 formed on it using a conventional metal deposition and photolithographic etching processes. Traces 134 are connected to a flexible wire 138 leading to display drivers 40 (FIG. 2) for LCD panel 122.

The traces 134 on connector 120 correspond to an electrode 134 pattern configured for the specific display panel 122 to be tested.

In one embodiment LCD panel 122 is positioned against a block 140, or other reference position, formed on table 12 of test system 10 so that the position of LCD panel 122 and the position of electrodes 124 will be predetermined. Connector 120 is either prepositioned with respect to block 140, or automatically or manually positioned with respect to block 140, so that the flexible circuit traces 134 align with the respective ones of electrodes 124 on LCD panel 122. The resilience of tape 132 ensures adequate pressure will be applied to each of electrodes 124.

Figure 11:
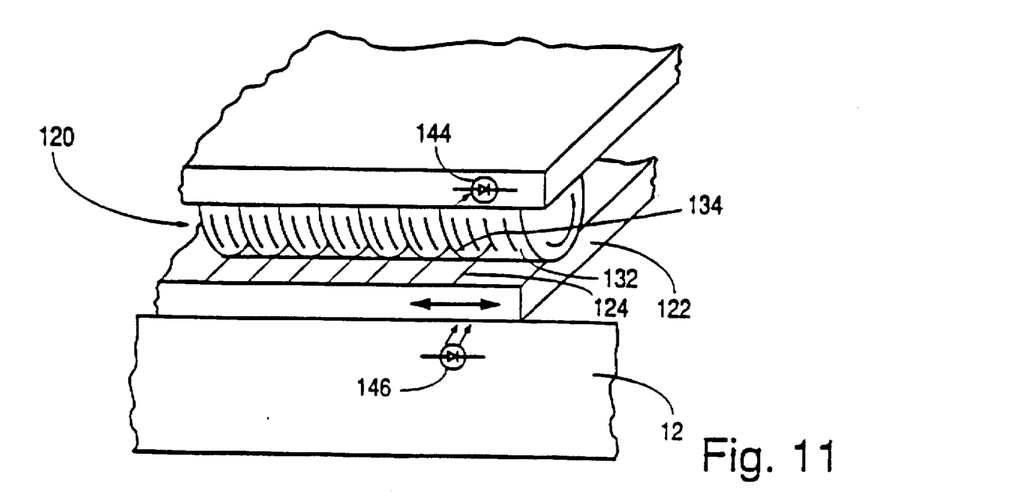
FIG. 11 is an enlarged edge portion of a display panel and a connector, when the hinged frame is closed, showing an alignment circuit for aligning the connector to electrodes on the display panel.

Additionally, if the alignment of block 140 with respect to traces 132 is not considered sufficiently reliable and reproducible for the accurate alignment of connector 120 with respect to electrodes 124, table 12, as shown in FIG. 11, may include a photodetector 144 which senses the overlapping of a first electrode 124 on LCD panel 122 and a respective trace 134 on flexible tape 132. A light emitting diode 146 is located in table 12 under transparent LCD panel 122. Flexible tape 132 is made transparent or semi-transparent so that the amount of light received by photodetector 144 is a maximum when trace 134 and electrode 124 overlap. The conductivity of photodetector 144 may then be used to automatically shift block 140 in FIG. 10 to shift LCD panel 122 with respect to connector 120 so as to obtain a maximum output signal from photodetector 144. In another embodiment, the positions of photodetector 144 and LED 146 are reversed.

Accordingly, an improved automatic test system for a flat-panel display has been described above which eliminates problems due to aliasing and Moiré patterns, and which accurately detects and corrects for brightness uniformity, color quality, and viewing angle for a flat-panel display.

It would be obvious to those of ordinary skill in the art to combine test system 10 with any type of display panel repair system, such as that described in U.S. Pat. No. 5,235,272, entitled "Method and Apparatus for Automatically Inspecting and Repairing an Active Matrix LCD Panel" to automatically repair any identified defective pixel. Hence, an automatic testing and repair system is also envisioned by this disclosure.

While preferred embodiments of the present invention have been shown and described, it will be obvious to those skilled in the art that changes and modifications may be made without departing from this invention in its broader aspects and, therefore, the appended claims are to encompass within their scope, all such changes and modifications that fall within the true spirit and scope of this invention.

What is claimed is:

1. A method for electronically detecting a displayed image, said displayed image being formed by a periodic array of display pixels, said method comprising the steps of:

positioning a spatially-periodic detection means for viewing said displayed image, said detection means including a first spatially-periodic array of detector elements on which said displayed image formed by a second spatially-periodic array of display pixels is focused, each of said detector elements generating signals corresponding to an intensity of light impinging thereon;

detecting first signals generated by said detector elements when said detector elements are in a first position relative to said displayed image, wherein said first signals may manifest a first Moiré pattern;

shifting said displayed image along an axis relative to a line of said detector elements to a second position;

detecting second signals generated by said detector elements when said detector elements are in said second position relative to said displayed image, wherein said second signals may manifest a second Moiré pattern; and averaging intensity levels said first signals and said second signals generated by said detector elements at each sampling point of said display pixels to reduce effects of said first Moiré pattern and said second Moiré patterns formed by said displayed image impinging onto said detector elements.

2. The method of claim 1 wherein said displayed image is shifted relative to said detector elements by rotating a reflector interposed between said displayed image and said detector elements.

3. The method of claim 1 further comprising the steps of:

additionally shifting said displayed image relative to said detector elements along a second line of said display pixels orthogonal to said first line of said display pixels; and detecting and averaging signals generated by said detector elements after each step of shifting until the effects of said Moiré patterns on determining relative intensity levels of said display pixels have been reduced to a desired level.

4. The method of claim 2 wherein said shifting is performed incrementally.

5. The method of claim 2 wherein said shifting step is about one-half of a display pixel along said first line.

6. The method of claim 2 wherein said additional shifting step is about one-half of a display pixel along said second line.

7. The method of claim 2 wherein said first line is an x-direction.

8. The method of claim 2 wherein said first line is a y-direction.

9. A test system for detecting a displayed image, said displayed image being generated by selective energization of a first spatially-periodic array of display pixels in a display panel, said test system comprising:

a detection means positioned for viewing said displayed image, said detection means including a second spatially-periodic array of detector elements for detecting an intensity of light from said displayed image impinging upon said detector elements;

means for shifting said image along an axis relative to a first line of said detector elements from a first position to a second position along said first line of said display pixels, wherein first signals manifest a first Moiré pattern and second signals manifest a second Moiré pattern; and means, connected to said detector means, for processing image signals generated by said detector elements for each shift of said image relative to said detector elements from said first position to said second position to produce an average of said first signals and said second signals at each sampling point over said array of said displayed pixels to produce third signals, said third signals having maximum intensity levels where separation of said first position and said second position eliminate a third Moiré pattern in said third signal.

10. The test system of claim 9 wherein said means for shifting comprises a rotating means for rotating a reflector interposed between said display image and said detector elements, said rotating means shifting said displayed image relative to said detector elements.

11. The test system of claim 9 further comprising:

means for additionally shifting said displayed image relative to said detector elements along a second line of said display pixels orthogonal to said first line of said display pixels; and means for detecting and averaging signals generated by said detector elements after each step of shifting until the effects of said Moiré patterns on determining relative intensity levels of said display pixels have been reduced to a desired level.

12. The test system of claim 10 wherein said shifting means is a means for incrementally shifting.

13. The test system of claim 10 wherein said shifting means is means for shifting about one-half of a display pixel along said first line.

14. The test system of claim 10 wherein said additional shifting means is means for additional shifting about one-half of a display pixel along said second line.

15. The test system of claim 10 wherein said first line is an x-direction.

16. The test system of claim 10 wherein said first line is a y-direction.

17. The test system of claim 10 wherein said detection means is a CCD camera.

18. A method for electronically detecting a displayed image, said displayed image being formed by a periodic array of display pixels, said method comprising the steps of:

positioning a spatially-periodic detection means comprising a CCD camera for viewing said displayed image, said detection means including a first spatially-periodic array of detector elements comprising camera pixels on which said displayed image formed by a second spatially-periodic array of display pixels is focused, each of said detector elements generating signals corresponding to an intensity of light impinging thereon;

detecting first signals generated by said detector elements when said detector elements are in a first position relative to said displayed image, wherein said first signals may manifest a first Moiré pattern;

shifting said displayed image about one-half of a display pixel along an axis relative to a first line of said detector elements to a second position;

detecting second signals generated by said detector elements when said detector elements are in said second position relative to said displayed image, wherein said second signals may manifest a second Moiré pattern; and averaging intensity levels said first signals and said second signals generated by said detector elements at each sampling point of said display pixels to reduce effects of said first Moiré pattern and said second Moiré pattern formed by said displayed image impinging onto said detector elements.

19. The method of claim 18 further comprising the steps of:

additionally shifting said displayed image relative to said detector elements about one-half of a display pixel along a second line of said display pixels orthogonal to said first line of said display pixels; and detecting and averaging signals generated by said detector elements after each step of shifting until the effects of said Moiré patterns on determining relative intensity levels of said display pixels have been reduced to a desired level.

20. The method of claim 19 wherein said first line of said display pixels is an x-direction.

* * * * *